United States Patent
Hu et al.

(10) Patent No.: US 12,149,330 B2
(45) Date of Patent: Nov. 19, 2024

(54) TRANSMISSION CONTROL METHOD AND APPARATUS, DEVICE, AND STORAGE MEDIUM

(71) Applicant: GUANGDONG OPPO MOBILE TELECOMMUNICATIONS CORP., LTD., Guangdong (CN)

(72) Inventors: Yi Hu, Guangdong (CN); Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 166 days.

(21) Appl. No.: 18/145,972

(22) Filed: Dec. 23, 2022

(65) Prior Publication Data

US 2023/0208508 A1    Jun. 29, 2023

Related U.S. Application Data

(63) Continuation of application No. PCT/CN2020/117502, filed on Sep. 24, 2020.

(51) Int. Cl.
*H04B 7/185*    (2006.01)
*H04W 76/20*    (2018.01)
(Continued)

(52) U.S. Cl.
CPC ........ *H04B 7/18513* (2013.01); *H04W 76/20* (2018.02); *H04W 76/38* (2018.02); *H04W 88/16* (2013.01)

(58) Field of Classification Search
CPC ............ H04B 7/18513; H04B 7/18541; H04B 7/1851; H04B 7/185; H04B 7/18508;
(Continued)

(56) References Cited

U.S. PATENT DOCUMENTS

| 2001/0004595 A1* | 6/2001 | Dent | H04W 68/08 455/435.2 |
|---|---|---|---|
| 2017/0230104 A1 | 8/2017 | Purkayastha et al. | |

(Continued)

FOREIGN PATENT DOCUMENTS

| CN | 107852230 | 3/2018 |
|---|---|---|
| CN | 110445528 | 11/2019 |

(Continued)

OTHER PUBLICATIONS

"3rd Generation Partnership Project; Technical Specification Group Radio Access Network; Solutions for NR to support non-terrestrial networks (NTN) (Release 16)," 3GPP TR 38.821, Dec. 2019, v1.0.0.

(Continued)

*Primary Examiner* — Andrew Wendell
(74) *Attorney, Agent, or Firm* — Hodgson Russ LLP

(57) ABSTRACT

In the method for transmission control, a terminal device receives indication information from a network device, where the indication information indicates that a satellite in communication with the terminal device performs feeder link switch between a first non-terrestrial network (NTN) gateway and a second NTN gateway, and the first NTN gateway and the second NTN gateway are connected to a same cell corresponding to the network device. The terminal device suspends UL transmission and/or DL transmission with the network device according to the indication information during the feeder link switch.

20 Claims, 8 Drawing Sheets

(51) Int. Cl.
*H04W 76/38* (2018.01)
*H04W 88/16* (2009.01)

(58) Field of Classification Search
CPC ............. H04B 7/18515; H04B 7/1853; H04B 7/2045; H04W 76/20; H04W 76/38; H04W 88/16; H04W 84/06; H04W 76/28
See application file for complete search history.

(56) References Cited

U.S. PATENT DOCUMENTS

| | | | |
|---|---|---|---|
| 2020/0106663 A1* | 4/2020 | Yoo ........................ | H04L 67/10 |
| 2020/0119807 A1 | 4/2020 | Whitefield et al. | |
| 2021/0227481 A1* | 7/2021 | Xu ..................... | H04W 74/0833 |
| 2021/0250816 A1* | 8/2021 | Xu ..................... | H04B 7/18508 |
| 2022/0046498 A1* | 2/2022 | Cheng ................. | H04B 7/1851 |
| 2022/0352971 A1* | 11/2022 | Liberg ............... | H04B 7/18519 |
| 2023/0171724 A1* | 6/2023 | Medles ............. | H04W 56/0015 |

FOREIGN PATENT DOCUMENTS

| | | |
|---|---|---|
| CN | 111314981 | 6/2020 |
| EP | 3332489 | 9/2019 |
| WO | WO 2019/201810 A1 * | 10/2019 ............. H04B 7/185 |
| WO | WO 2020/067973 A1 * | 4/2020 ............. H04B 7/185 |
| WO | 2020092561 | 5/2020 |

OTHER PUBLICATIONS

MediaTek Inc., "Summary#4 of 8.4.4 Other Aspects of NR-NTN," 3GPP TSG RAN WG1 Meeting #102e, R1-2007233, Aug. 2020.
CATT et al., "TP on Feeder Link Switch," 3GPP TSG-RAN WG2 Meeting 108, R2-1916386, Nov. 2019.
WIPO, International Search Report and Written Opinion for International Application No. PCT/CN2020/117502, Jun. 23, 2021.
"3rd Generation Partnership Project; Technical Specification Group Radio Access Network; Solutions for NR to support non-terrestrial networks (NTN) (Release 16)," 3GPP TR 38.821, Dec. 2019, v16.0.0.
CATT, "Discussion for beam management and feeder link switch enhancement", 3GPP TSG RAN WG1 #102-e, R1-2005709, Aug. 2020.
EPO, Extended European Search Report for EP Application No. 20954516.9, Oct. 12, 2023.

* cited by examiner

TERMINAL DEVICE 130

NETWORK DEVICE 140

TRANSMISSION CONTROL METHOD AND APPARATUS, DEVICE, AND STORAGE MEDIUM

CROSS REFERENCE TO RELATED APPLICATION(S)

This application is a continuation of International Application No. PCT/CN2020/117502, filed Sep. 24, 2020, the entire disclosure of which is incorporated herein by reference.

TECHNICAL FIELD

Implementations of the disclosure relate to the field of communication technology, in particular, to a method for transmission control and a terminal device.

BACKGROUND

Non-terrestrial network (NTN) technologies are introduced into the fifth generation (5G) new radio (NR) system. The NTN technology generally provides communication services for terrestrial users through satellite communication.

In the transparent-payload network architecture based on the NTN technology, transmission between the terminal device and the network device (such as a base station) can be performed via a satellite and an NTN gateway (usually located on the ground). For example, in downlink (DL) transmission, the network device transmits a DL signal to the NTN gateway, the NTN gateway forwards the DL signal to the satellite, and then the satellite forwards the DL signal to the terminal device. The radio link between the satellite and the NTN gateway may be referred to as a feeder link. When the satellite moves at high speed, the connection between the satellite and the NTN gateway will be switched, that is, switched from one NTN gateway to another NTN gateway. Such switch can be referred to as feeder link switch.

During feeder link switch, how to perform uplink (UL) transmission and DL transmission between the terminal device and the network device is an open problem.

SUMMARY

According to an aspect of implementations of the disclosure, a method for transmission control is provided. The method is applicable to a terminal device and includes the following. Indication information is received from a network device, where the indication information indicates that a satellite in communication with the terminal device performs feeder link switch between a first non-terrestrial network (NTN) gateway and a second NTN gateway, and the first NTN gateway and the second NTN gateway are connected to a same cell corresponding to the network device. Uplink (UL) transmission and/or downlink (DL) transmission with the network device are suspended according to the indication information during the feeder link switch.

According to an aspect of implementations of the disclosure, a method for transmission control is provided. The method is applicable to a network device and includes the following. Indication information is transmitted to a terminal device, where the indication information indicates that a satellite in communication with the terminal device performs feeder link switch between a first NTN gateway and a second NTN gateway, and the first NTN gateway and the second NTN gateway are connected to a same cell corresponding to the network device. UL transmission and/or DL transmission with the terminal device are suspended during the feeder link switch.

According to an aspect of implementations of the disclosure, a terminal device is provided. The terminal device includes a transceiver, a memory configured to store computer programs, and a processor configured to invoke and execute the computer programs stored in the memory to: cause the transceiver to receive indication information from a network device, where the indication information indicates that a satellite in communication with a terminal device performs feeder link switch between a first NTN gateway and a second NTN gateway, and the first NTN gateway and the second NTN gateway are connected to a same cell corresponding to the network device, and suspend UL transmission and/or DL transmission with the network device according to the indication information during the feeder link switch.

DETAILED DESCRIPTION

Figure 1:
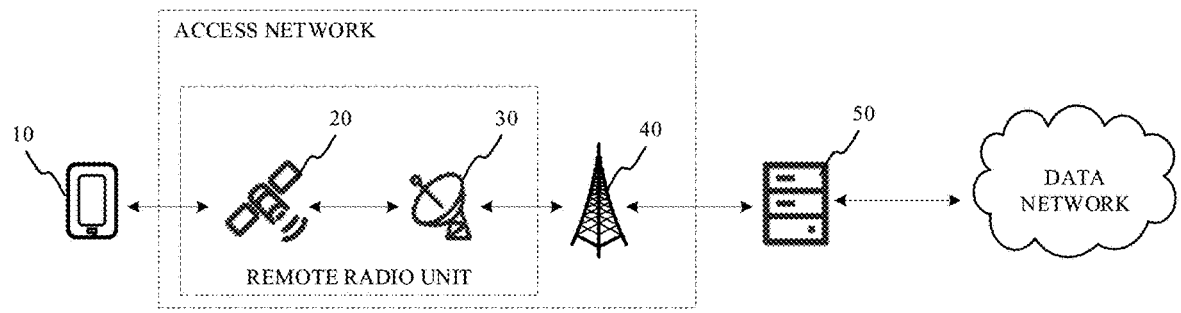
FIG. 1 is a schematic diagram of a transparent-payload satellite network architecture provided in implementations of the disclosure.

In order to make purposes, technical solutions, and advantages of the disclosure clearer, implementations of the disclosure will be further described in detail below with reference to accompanying drawings.

Network architectures and service scenarios described in implementations of the disclosure are for more clearly illustration of the technical solutions of implementations of the disclosure, and do not constitute limitations on the technical solutions provided in implementations of the disclosure. Those of ordinary skill in the art can appreciate that, with evolution of network architectures and emergence of new service scenarios, for similar technical problems, the technical solutions provided in implementations of the disclosure are also applicable.

At present, non-terrestrial network (NTN) technologies are studied by related standard organizations. The NTN technology generally provides communication services to terrestrial users through satellite communication. Compared with terrestrial cellular network communication, the satellite communication has many unique advantages. First, the satellite communication is not constrained by areas of the users. For example, terrestrial communication is not able to cover sparsely populated areas as well as areas where communication devices cannot be set up, such as oceans, mountains, and deserts. In contrast, for the satellite communication, one satellite can cover a large area, and the satellite can orbit the earth, therefore, in theory, every corner on the earth can be covered for satellite communication. Second, the satellite communication has greater social value. Remote mountainous areas, poor and backward countries or regions can be covered for satellite communication at a low cost, so that people in these areas can enjoy advanced voice communication and mobile internet technologies, thereby narrowing a digital gap with developed areas and promoting the development of these areas. Third, a satellite has a long communication distance, and a communication cost thereof does not increase greatly with the increase of the communication distance. Finally, the satellite communication has high stability and is not constrained by natural disasters.

Communication satellites are classified into low-earth orbit (LEO) satellites, medium-earth orbit (MEO) satellites, geostationary earth orbit (GEO) satellites, high elliptical orbit (HEO) satellites, and the like according to different orbital altitudes. At present, LEO and GEO are mainly studied.

1. LEO

For the LEO satellite, the orbital altitude thereof is in the range of 500 km to 1500 km, a corresponding orbital period is about 1.5 hours to 2 hours, and signal propagation delay of single-hop communication between users is generally less than 20 ms. A satellite has a maximum visibility time of 20 minutes, a short signal propagation distance, and a less link loss is small, and does not have high transmission power requirements for a user terminal device.

2. GEO

For the GEO satellite, the orbital altitude thereof is 35786 km, a rotation period around the earth thereof is 24 hours, and signal propagation delay of single-hop communication between users is generally 250 ms.

In order to ensure the coverage of the satellite and increase the system capacity of the entire satellite communication system, the satellite uses multi-beams to cover the ground. One satellite can provide dozens of or even hundreds of beams for ground coverage, and one beam can cover a ground area with a diameter of tens to hundreds of kilometers.

In the satellite network architecture constructed based on the NTN technology, the transponder on the communication satellite is a core component of the communication satellite. The transponder is configured to perform amplification and frequency conversion on weak signals such as phone calls, telegrams, faxes, data, and images transmitted by the terrestrial station and received at the antenna of the satellite, and then transmit the signals to another location via the transmitting antenna, so as to achieve the communication between two locations through the satellite. As can be seen, the number of transponders of a communication satellite is a standard for measuring the communication capability of the satellite. A contemporary communication satellite is already equipped with hundreds of transponders. Currently, there are two types of transponders. One type of transponder is a transparent transponder which does not perform processing on received signals except for amplification and frequency conversion, but simply completes a task of forwarding. Therefore, the transparent transponder is "transparent" to any signal. The other type of transponder is a processing transponder (regenerative type) which not only forwards signals, but also has a signal processing function. There are many kinds of transponders for signal processing, which can be selected according to the communication requirement and have the following functions and characteristics.

(1) By demodulating and regenerating the signal, the noise superimposed on the signal in the uplink (UL) can be removed, thereby improving the transmission quality of the entire communication link.

(2) By demodulating and remodulating the signal, the UL and the downlink (DL) are designed separately, so that the UL and the DL can implement different modulation systems and multi-access modes, thereby reducing the transmission requirement and the complexity of terrestrial equipment.

(3) By processing the signal on the satellite, the dynamic allocation of the channel, the frequency, the power, and the beam of the subscriber line can be achieved, thereby achieving optimum utilization of the satellite resources.

(4) By connecting the forward link with the return-link signal processor, the communication between mobile users can be achieved by one forwarding, thereby reducing the space propagation delay.

(5) By processing the signal on the satellite, an interstellar communication link can be established to achieve satellite interstellar networking. The interstellar communication link refers to a communication link between satellites with the following functions and characteristics. The communication between any two points on the earth can be achieved through direct communication without the terrestrial network, which is conducive to the unified management of the entire satellite mobile communication system by the terrestrial management center.

Referring to FIG. 1, FIG. 1 is a schematic diagram of a satellite network architecture. Communication satellites in the satellite network architecture are transparent-payload satellites. As illustrated in FIG. 1, the satellite network architecture includes a terminal device 10, a satellite 20, an NTN gateway 30, a network device 40, and a core network device 50.

The terminal device 10 can communicate with the network device 40 via an air interface (such as a Uu interface). In the architecture illustrated in FIG. 1, the network device 40 can be deployed on the ground, and UL and DL communications between the terminal device 10 and the network device 40 can be performed via the satellite 20 and the NTN gateway 30 (usually located on the ground). For example, in UL transmission, the terminal device 10 transmits a UL signal to the satellite 20, the satellite 20 forwards the UL signal to the NTN gateway 30, the NTN gateway 30 forwards the UL signal to the network device 40, and then the network device 40 transmits the UL signal to the core network device 50. For example, in DL transmission, a DL signal from the core network device 50 is transmitted to the network device 40, the network device 40 transmits the DL signal to the NTN gateway 30, the NTN gateway 30 forwards the DL signal to the satellite 20, and then the satellite 20 forwards the DL signal to the terminal device 10.

Figure 2:
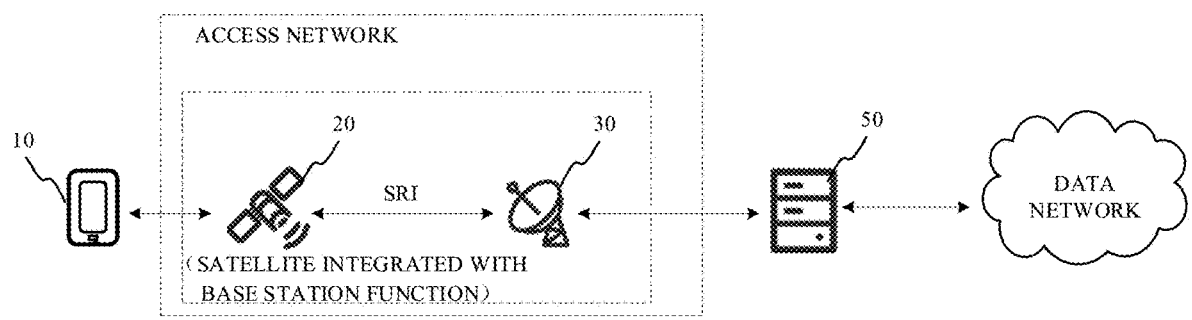
FIG. 2 is a schematic diagram of a regenerative-payload satellite network architecture provided in implementations of the disclosure.

Referring to FIG. 2, FIG. 2 is a schematic diagram of another satellite network architecture. Communication satellites in the satellite network architecture are regenerative-payload satellites. As illustrated in FIG. 2, the satellite network architecture includes a terminal device 10, a satellite 20, an NTN gateway 30, and a core network device 50.

In the architecture illustrated in FIG. 2, functions of the network device 40 are integrated on the satellite 20, that is, the satellite 20 has the functions of the network device 40. The terminal device 10 can communicate with the satellite 20 via an air interface (such as a Uu interface). The satellite 20 can communicate with the NTN gateway 30 (usually located on the ground) via a satellite radio interface (SRI).

In the architecture illustrated in FIG. 2, for example, in UL transmission, the terminal device 10 transmits a UL signal to the satellite 20, the satellite 20 forwards the UL signal to the NTN gateway 30, and then the NTN gateway 30 transmits the UL signal to the core network device 50. For example, in DL transmission, a DL signal from the core network device 50 is transmitted to the NTN gateway 30, the NTN gateway 30 forwards the DL signal to the satellite 20, and then the satellite 20 forwards the DL signal to the terminal device 10.

In the network architectures illustrated in FIGS. 1 and 2, the network device 40 is a device configured to provide wireless communication services for the terminal device 10. A connection may be established between the network device 40 and the terminal device 10, so that communication including signaling and data interaction can be performed via the connection. There may be multiple network devices 40. Two adjacent network devices 40 may communicate with each other in a wired or wireless manner. The terminal device 10 can switch between different network devices 40, that is, establish a connection with different network devices 40.

For example, in a cellular communication network, the network device 40 may be a base station. The base station is a device deployed in an access network to provide wireless communication functions for the terminal device 10. The base station may include macro base stations, micro base stations, relay stations, access points, and the like in various forms. In systems adopting different radio access technologies, devices with base station functions may have different names. For example, in a fifth generation (5G) new radio (NR) system, such devices are referred to as gNodeB or gNB. The name "base station" may change with evolution of communication technologies. For the convenience of description, in implementations of the disclosure, devices that provide wireless communication functions for the terminal device 10 are collectively referred to as base stations or network devices.

In addition, the terminal device 10 in implementations of the disclosure may include various handheld devices, vehicle-mounted devices, wearable devices, computing devices with wireless communication functions, or other processing devices connected to a wireless modem, as well as user equipment (UE), mobile stations (MS), terminal devices, and the like in various forms. For the convenience of description, in implementations of the disclosure, such devices are collectively referred to as terminal devices.

In addition, for example, in a 5G NTN network, the NTN network may include multiple satellites 20. One satellite 20 may cover a certain ground area and provide wireless communication services for terminal devices 10 in the ground area. In addition, the satellite 20 can orbit the earth. By deploying multiple satellites 20, communication coverage of different areas on the surface of the earth can be achieved.

In addition, in implementations of the disclosure, terms "network" and "system" are usually used interchangeably, but those skilled in the art can understand their meanings.

When the satellite 20 moves at high speed, the connection between the satellite 20 and the NTN gateway 30 will be switched, that is, switched from one NTN gateway to another NTN gateway. Such switch can be referred to as feeder link switch. In the disclosure, a feeder link is a radio link between the satellite 20 and the NTN gateway 30, and is also referred to as a feeder line link or the like, which is not limited herein.

Figure 3:
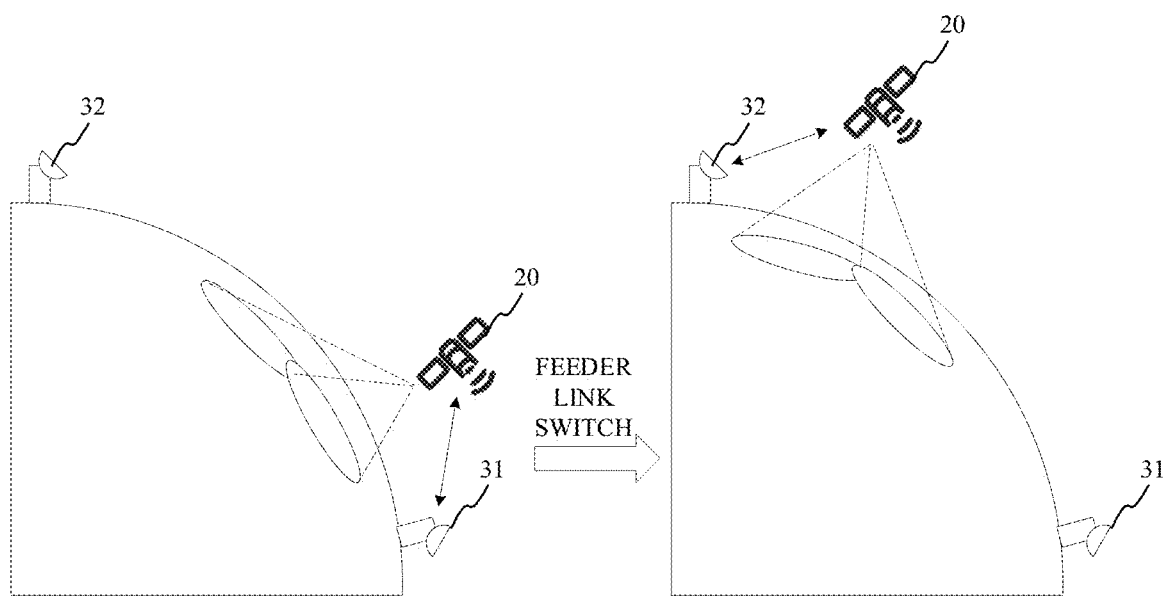
FIG. 3 is a schematic diagram illustrating feeder link switch provided in implementations of the disclosure.

As illustrated in FIG. 3, the satellite 20 performs feeder link switch from a first NTN gateway 31 to a second NTN gateway 32.

If the first NTN gateway 31 and the second NTN gateway 32 are connected to two cells corresponding to two different network devices such as base stations (the base station may be a complete base station or a centralized unit (CU)), or connected to two cells corresponding to the same network device, all terminal devices in the coverage of the satellite 20 need to switch from an original cell to a new cell after the feeder link switch is completed.

If the first NTN gateway 31 and the second NTN gateway 32 are connected to the same cell corresponding to the same network device, the terminal device theoretically does not need to perform switch.

There are two schemes for feeder link switch. One scheme is hard switch where the satellite disconnects from an original NTN gateway, and then connects to a new NTN gateway, i.e., break-before-make. The other scheme is soft switch where the satellite establishes a connection with the new NTN gateway while maintaining the connection with the original NTN gateway, and then disconnects from the original NTN gateway, i.e., make-before-break.

For two NTN gateways connected to the same cell, during the feeder link switch (hard switch) performed by the satellite between the two NTN gateways, there is a time period when there is no connection between the satellite and any NTN gateway. UL transmission and DL transmission cannot be performed between the terminal device and the network device (such as a base station) within this time period. For example, during this time period, the network device cannot successfully transmit a DL signal to the terminal device or receive a UL signal from the terminal device, where the DL signal includes a synchronization signal and physical broadcast channel (PBCH) block (SSB), a channel state information-reference signal (CSI-RS), and the like. Therefore, during this time period, UL transmission and DL transmission triggered between the terminal device and the network device will not succeed, but instead cause the terminal device and the network device to perform unnecessary operations.

In the disclosure, for the above situation, that is, for two NTN gateways connected to the same cell, during the feeder link switch (hard switch) performed by the satellite between the two NTN gateways, the UL transmission and/or the DL transmission between the terminal device and the network device are suspended, so as to prevent the terminal device and the network device from performing unnecessary operations, thereby reducing the system overhead.

The technical solutions of the disclosure will be described with implementations.

Figure 4:
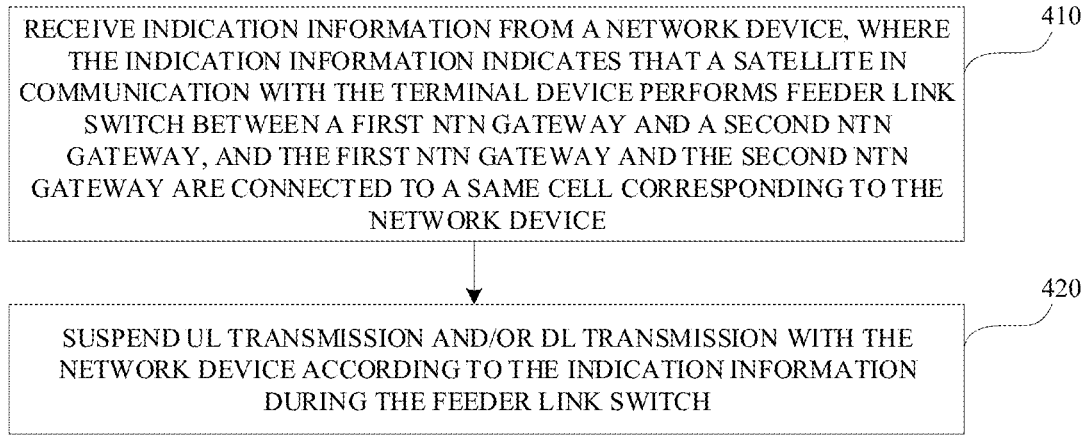
FIG. 4 is a flowchart of a method for transmission control provided in implementations of the disclosure.

Referring to FIG. 4, FIG. 4 is a flowchart of a method for transmission control provided in implementations of the disclosure. The method is applicable to a terminal device and may include the following steps 410 to 420.

Step 410, indication information is received from a network device, where the indication information indicates that a satellite in communication with the terminal device performs feeder link switch between a first NTN gateway and a second NTN gateway, and the first NTN gateway and the second NTN gateway are connected to a same cell corresponding to the network device.

Optionally, the satellite in communication with the terminal device performs the feeder link switch between the first NTN gateway and the second NTN gateway, which refers to switching from the first NTN gateway to the second NTN gateway, and the switch is a hard switch. That is, the satellite disconnects from the first NTN gateway, and then establishes a connection with the second NTN gateway.

The network device transmits the indication information to the terminal device after learning of the feeder link switch event. Optionally, the indication information includes at least one of: first time information, second time information, and duration information. The first time information indicates a start moment of the feeder link switch. The second time information indicates a completion moment of the feeder link switch. The duration information indicates a duration of the feeder link switch. Exemplarily, assuming that the start moment of the feeder link switch is t1, the completion moment of the feeder link switch is t2, and the duration of the feeder link switch is $\Delta t$, then $t2=t1+\Delta t$.

In addition, in implementations of the disclosure, there is no limitation on the message or signaling carrying the indication information. For example, the terminal device receives a system message from the network device, where the system message includes the indication information. Alternatively, the terminal device receives a radio resource control (RRC) signaling from the network device, where the RRC signaling includes the indication information. Alternatively, the terminal device receives a media access control (MAC) control element (CE) signaling from the network device, where the MAC CE signaling includes the indication information.

Step 420, UL transmission and/or DL transmission with the network device are suspended according to the indication information during the feeder link switch.

Optionally, the terminal device determines the start moment and the completion moment of the feeder link switch according to the indication information, and suspends the UL transmission and/or the DL transmission with the network device during the feeder link switch, that is, during a time period from the start moment of the feeder link switch to the completion moment of the feeder link switch. Between the terminal device and the network device, only the UL transmission is suspended, only the DL transmission is suspended, or both the UL transmission and the DL transmission are suspended, which is not limited herein.

In exemplary implementations, the UL transmission and the DL transmission between the terminal device and the network device may be suspended as follows. A first timer related to a MAC entity of the terminal device is paused, where the first timer is used to control the MAC entity to perform UL transmission and/or DL transmission. When the first timer is running, the UL transmission and the DL transmission may be triggered. The triggering of the UL transmission and the DL transmission can be avoided by pausing the first timer.

Optionally, the first timer includes but is not limited to at least one of the following.

1. A configured grant (CG) timer (configuredGrantTimer) corresponding to each UL hybrid automatic repeat request (HARQ) process reserved for CG. The configured grant timer configuredGrantTimer is used to control the use of a UL HARQ process reserved for CG. For example, for the UL HARQ process reserved for CG, start the configuredGrantTimer after each transmission using the UL HARQ process. When the configuredGrantTimer is running, the UL HARQ process cannot be used for transmission on CG until the configuredGrantTimer expires.

2. A scheduling request (SR) prohibit timer (sr-ProhibitTimer) corresponding to each SR configuration. The SR prohibit timer sr-ProhibitTimer is used to limit SR signal transmission in a physical uplink control channel (PUCCH). When the timer is running, the SR cannot be transmitted. The terminal device can retransmit the SR upon the expiry of the timer, until the maximum number of transmissions is reached.

3. A buffer status report (BSR) retransmission timer (retxBSR-Timer). Start or restart the BSR retransmission timer retxBSR-Timer at every BSR report.

4. A BSR periodic timer (periodicBSR-Timer). Start the BSR periodic timer periodicBSR-Timer at every BSR report except when all BSRs are long truncated BSRs or short truncated BSRs.

5. A discontinuous reception (DRX) inactivity timer (drx-InactivityTimer). The DRX inactivity timer drx-InactivityTimer refers to a timer configured to monitor a DL physical downlink control channel (PDCCH). The terminal device starts the drx-InactivityTimer upon receiving a PDCCH indicating new UL data or new DL data for transmission. When the drx-InactivityTimer is running, the terminal device needs to monitor the PDCCH.

6. A DRX DL retransmission timer (drx-RetransmissionTimerDL) corresponding to each DL HARQ process. The drx-RetransmissionTimerDL refers to the maximum duration that the terminal device waits for DL retransmission scheduling for each DL HARQ process. If a timer drx-HARQ-RTT-TimerDL expires, and the terminal device feeds back a negative acknowledgment (NACK) for a physical downlink shared channel (PDSCH) of the DL HARQ process, start the timer drx-RetransmissionTimerDL. During the active period of the timer drx-RetransmissionTimerDL, the terminal device remains active to receive a possible PDCCH transmitted by the network device to the terminal device indicating the scheduling of DL retransmission or new transmission.

7. A DRX UL retransmission timer (drx-RetransmissionTimerUL) corresponding to each UL HARQ process. The drx-RetransmissionTimerUL refers to the maximum duration that the terminal waits for UL retransmission for each UL HARQ process. If a timer drx-HARQ-RTT-TimerUL expires, start the timer drx-RetransmissionTimerUL. During the active period of the timer drx-RetransmissionTimerUL, the terminal device remains active to receive a possible PDCCH transmitted by the network device to the terminal device indicating the scheduling of UL retransmission or new transmission.

8. A DRX short cycle timer (drx-ShortCycleTimer). When a short DRX cycle is configured, if the drx-InactivityTimer expires or a DRX command MAC CE is received, start or restart the drx-ShortCycleTimer, and start using the short DRX cycle. If the drx-ShortCycleTimer expires, start using a long DRX cycle.

9. A secondary cell (SCell) deactivation timer (sCellDeactivationTimer) corresponding to each SCell. The SCell deactivation timer sCellDeactivationTimer is used to maintain the state of the SCell. For example, start or restart the sCellDeactivationTimer upon receiving a signaling indicating the activation of the SCell or when there is data to transmit in the SCell, and deactivate the SCell after the sCellDeactivationTimer expires.

10. A bandwidth part (BWP) inactivity timer (bwp-InactivityTimer). The BWP inactivity timer bwp-InactivityTimer is used to count how long the terminal device does not transmit or receive data. After bwp-InactivityTimer expires, the terminal device switches to a default BWP or a DL initial BWP.

11. A data inactivity timer (dataInactivityTimer). When the terminal device receives a MAC service data unit (SDU) for a dedicated transmission channel (DTCH), a dedicated control channel (DCCH), or a common control channel (CCCH), or transmits a MAC SDU for a DTCH or a DCCH during the monitoring of a control channel, the terminal device starts or restarts the timer and continuously monitors the control channel until the timer expires.

12. A beam failure detection timer (beamFailureDetectionTimer) for beam failure detection. The terminal device starts or restarts the timer every time the terminal device receives an indication of a beam failure instance. If the timer expires, it indicates that the received beam failure instance is discontinuous, and a MAC-layer entity of the terminal device can reset a beam failure counter to zero.

13. A beam failure recovery timer (beamFailureRecoveryTimer) for beam failure recovery. The timer is used to monitor whether a beam failure recovery procedure succeeds.

14. A time alignment timer (timeAlignmentTimer) corresponding to a timing advance group (TAG). The terminal device starts the timer upon receiving a TA command. When the timer expires, the terminal device is considered to be in a UL out-of-sync state.

Figure 5:
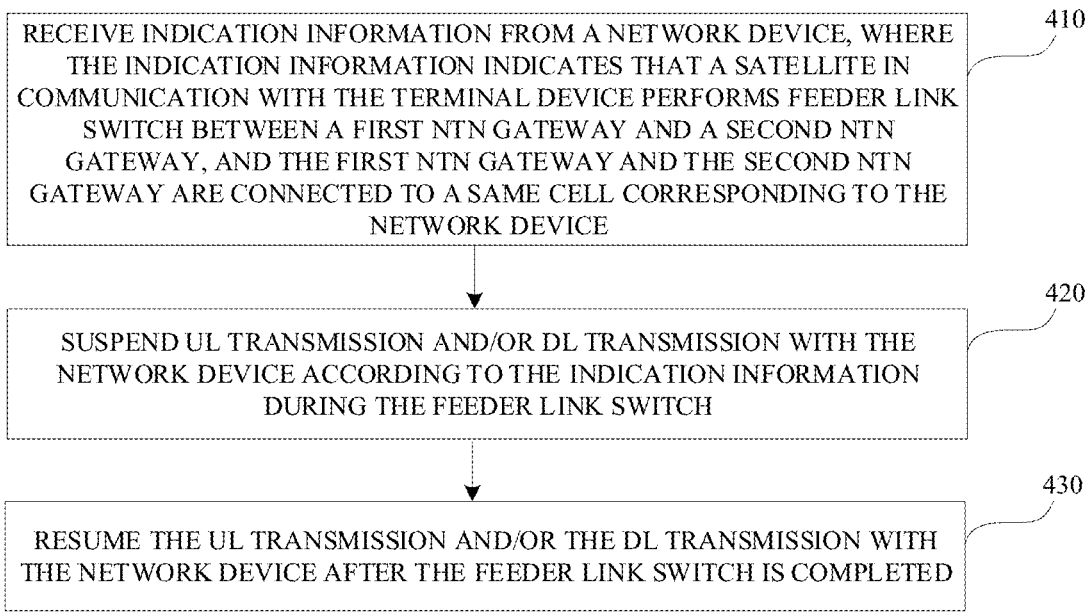
FIG. 5 is a flowchart of a method for transmission control provided in other implementations of the disclosure.

Optionally, as illustrated in FIG. 5, after step 420, the method further includes the following.

Step 430, the UL transmission and/or the DL transmission with the network device are resumed after the feeder link switch is completed.

After the feeder link switch is completed, the satellite has successfully established a connection with a new NTN gateway, so the satellite can normally provide UL and DL transmission services for the terminal device. In the disclosure, after the feeder link switch is completed, the terminal device resumes the UL transmission and/or the DL transmission with the network device, so as to resume the UL transmission and the DL transmission in time, thereby ensuring the user experience.

Optionally, if the first timer is paused during the feeder link switch, the first timer is resumed after the feeder link switch is completed, so as to ensure the resumption of the UL transmission and the DL transmission.

Moments to pause and resume the first timer are illustrated below with examples.

In an example, the indication information includes first time information and second time information, the first time information indicates a start moment t1 of the feeder link switch, and the second time information indicates a completion moment t2 of the feeder link switch. The terminal device may pause the first timer at the start moment t1, and resume the first timer at the completion moment t2.

In another example, the indication information includes second time information, and the second time information indicates a completion moment t2 of the feeder link switch. The terminal device may pause the first timer upon receiving the indication information, and resume the first timer at the completion moment t2.

In another example, the indication information includes first time information and duration information, the first time information indicates a start moment t1 of the feeder link switch, and the duration information indicates a duration $\Delta t$ of the feeder link switch. The terminal device may pause the first timer at the initial time t1, and resume the first timer at a completion moment t1+$\Delta t$.

Figure 6:
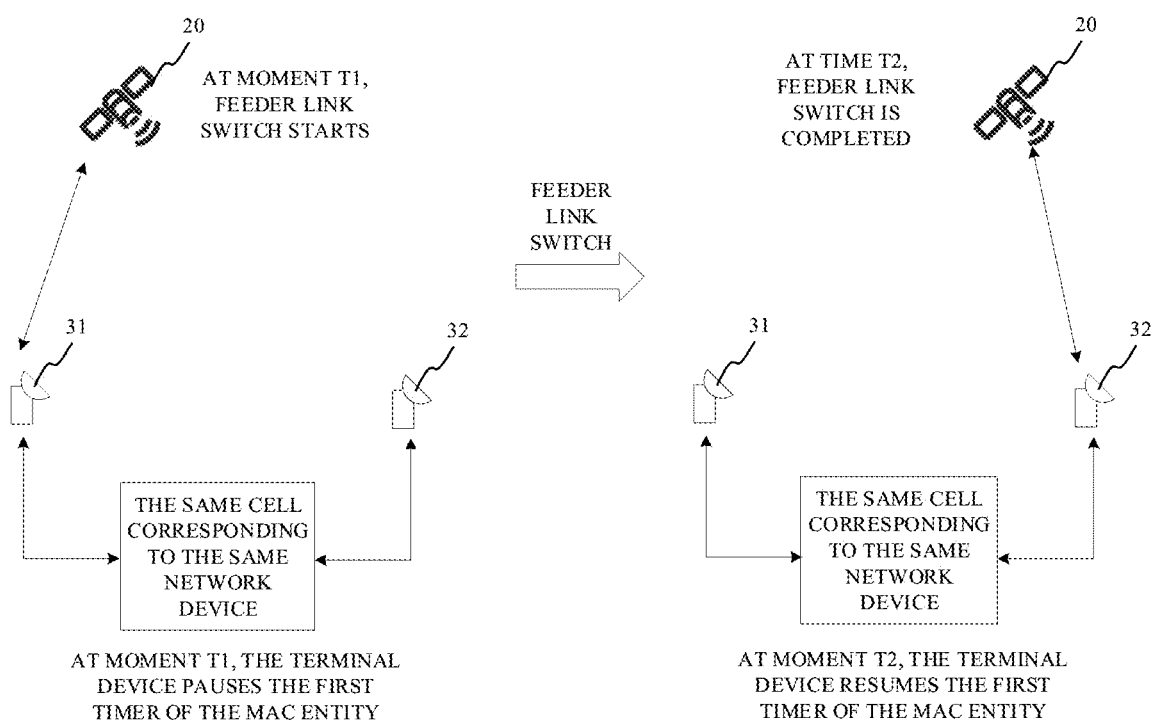
FIG. 6 is a schematic diagram illustrating feeder link switch and transmission control provided in implementations of the disclosure.

As illustrated in FIG. 6, at moment t1, the satellite 20 disconnects from the first NTN gateway 31, starts feeder link switch, and switches from the first NTN gateway 31 to the second NTN gateway 32. At moment t2, the satellite 20 completes the feeder link switch, and establishes a connection with the second NTN gateway 32 successfully. Correspondingly, at moment t1, the terminal device pauses the first timer of the MAC entity. At moment t2, the terminal device resumes the first timer of the MAC entity. In this way, during the feeder link switch, the UL transmission and/or the DL transmission between the terminal device and the network device are suspended.

In conclusion, in the technical solutions provided in implementations of the disclosure, for two NTN gateways connected to the same cell, during the feeder link switch (hard switch) performed by the satellite between the two NTN gateways, the UL transmission and/or the DL transmission between the terminal device and the network device are suspended, so as to prevent the terminal device and the network device from performing unnecessary operations, thereby reducing the system overhead.

In addition, after the feeder link switch is completed, the terminal device resumes the UL transmission and/or the DL transmission with the network device, so as to resume the UL transmission and the DL transmission in time, thereby ensuring the user experience.

Figure 7:
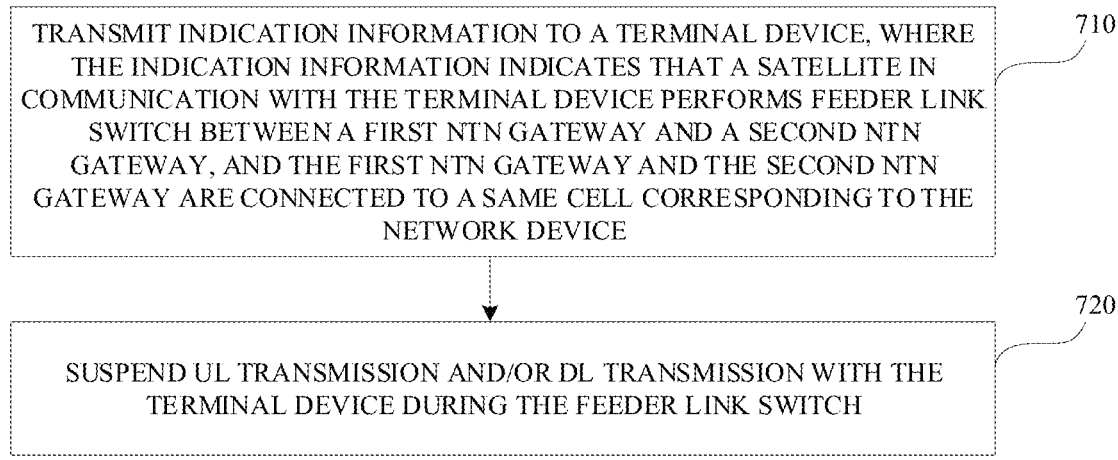
FIG. 7 is a flowchart of a method for transmission control provided in other implementations of the disclosure.

Referring to FIG. 7, FIG. 7 is a flowchart of a method for transmission control provided in other implementations of the disclosure. The method is applicable to a network device and may include the following steps 710 to 720.

Step 710, indication information is transmitted to a terminal device, where the indication information indicates that a satellite in communication with the terminal device performs feeder link switch between a first NTN gateway and a second NTN gateway, and the first NTN gateway and the second NTN gateway are connected to a same cell corresponding to the network device.

Optionally, the satellite in communication with the terminal device performs the feeder link switch between the first NTN gateway and the second NTN gateway, which refers to switching from the first NTN gateway to the second NTN gateway, and the switch is a hard switch. That is, the satellite disconnects from the first NTN gateway, and then establishes a connection with the second NTN gateway.

The network device transmits the indication information to the terminal device after learning of the feeder link switch event. Optionally, the indication information includes at least one of: first time information, second time information, and duration information. The first time information indicates a start moment of the feeder link switch. The second time information indicates a completion moment of the feeder link switch. The duration information indicates a duration of the feeder link switch. Exemplarily, assuming that the start moment of the feeder link switch is t1, the completion moment of the feeder link switch is t2, and the duration of the feeder link switch is $\Delta t$, then t2=t1+$\Delta t$.

In addition, in implementations of the disclosure, there is no limitation on the message or signaling carrying the indication information. For example, the network device transmits a system message to the terminal device, where the system message includes the indication information. Alternatively, the network device transmits a RRC signaling to the terminal device, where the RRC signaling includes the indication information. Alternatively, the network device transmits a MAC CE signaling to the terminal device, where the MAC CE signaling includes the indication information.

Step 720, UL transmission and/or DL transmission with the terminal device are suspended during the feeder link switch.

Optionally, the network device determines the start moment and the completion moment of the feeder link switch, and suspends the UL transmission and/or the DL transmission with the terminal device during the feeder link switch, that is, during a time period from the start moment of the feeder link switch to the completion moment of the feeder link switch. Between the network device and the terminal device, only the UL transmission is suspended, only the DL transmission is suspended, or both the UL transmission and the DL transmission are suspended, which is not limited herein.

In exemplary implementations, the UL transmission and the DL transmission between the terminal device and the network device may be suspended as follows. A first timer related to a MAC entity of the terminal device is paused, where the first timer is used to control the MAC entity to perform UL transmission and/or DL transmission. When the first timer is running, the UL transmission and the DL transmission may be triggered. The triggering of the UL transmission and the DL transmission can be avoided by pausing the first timer. For the description of the first timer, reference may be made to foregoing implementations, which will not be repeated herein.

Figure 8:
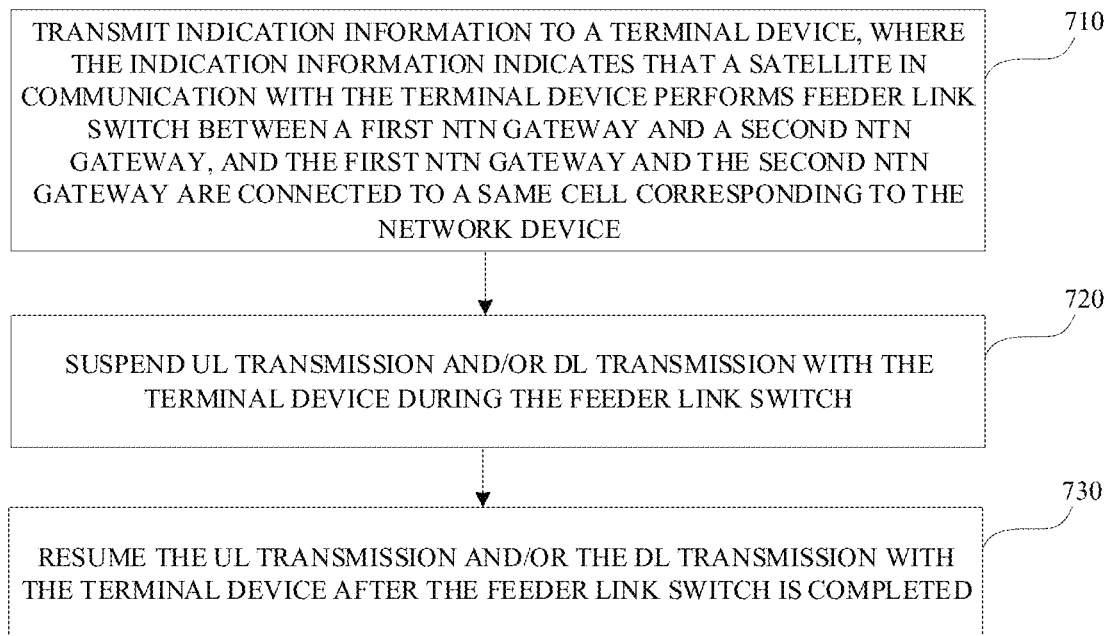
FIG. 8 is a flowchart of a method for transmission control provided in other implementations of the disclosure.

Optionally, as illustrated in FIG. 8, after step 720, the method further includes the following.

Step 730, the UL transmission and/or the DL transmission with the terminal device are resumed after the feeder link switch is completed.

After the feeder link switch is completed, the satellite has successfully established a connection with a new NTN gateway, so the satellite can normally provide UL and DL transmission services for the terminal device. In the disclosure, after the feeder link switch is completed, the network device resumes the UL transmission and/or the DL transmission with the terminal device, so as to resume the UL transmission and the DL transmission in time, thereby ensuring the user experience.

In conclusion, in the technical solutions provided in implementations of the disclosure, for two NTN gateways connected to the same cell, during the feeder link switch (hard switch) performed by the satellite between the two NTN gateways, the UL transmission and/or the DL transmission between the terminal device and the network device are suspended, so as to prevent the terminal device and the network device from performing unnecessary operations, thereby reducing the system overhead.

In addition, after the feeder link switch is completed, the network device resumes the UL transmission and/or the DL transmission with the terminal device, so as to resume the UL transmission and the DL transmission in time, thereby ensuring the user experience.

The following are apparatus implementations of the disclosure, which can be used to implement method implementations of the disclosure. For details not disclosed in apparatus implementations of the disclosure, refer to method implementations of the disclosure.

Figure 9:
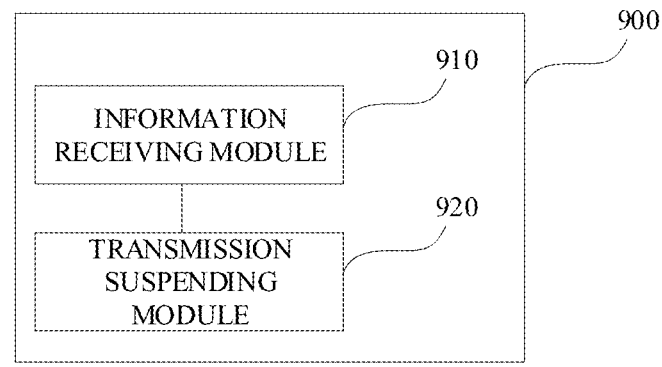
FIG. 9 is a block diagram of an apparatus for transmission control provided in implementations of the disclosure.

Referring to FIG. 9, FIG. 9 is a block diagram of an apparatus for transmission control provided in implementations of the disclosure. The apparatus has a function configured to implement method examples at terminal device side, and the function may be implemented by hardware, or by executing corresponding software by hardware. The apparatus may be a terminal device, or may be provided in the terminal device. As illustrated in FIG. 9, the apparatus 900 may include an information receiving module 910 and a transmission suspending module 920.

The information receiving module 910 is configured to: receive indication information from a network device, where the indication information indicates that a satellite in communication with a terminal device performs feeder link switch between a first NTN gateway and a second NTN gateway, and the first NTN gateway and the second NTN gateway are connected to a same cell corresponding to the network device. The transmission suspending module 920 is configured to: suspend UL transmission and/or DL transmission with the network device according to the indication information during the feeder link switch.

In exemplary implementations, the transmission suspending module 920 is configured to: pause a first timer related to a MAC entity of the terminal device, where the first timer is used to control the MAC entity to perform UL transmission and/or DL transmission.

Figure 10:
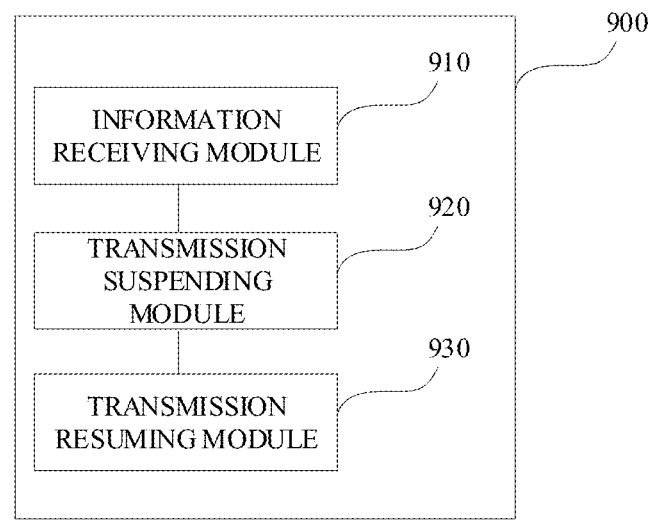
FIG. 10 is a block diagram of an apparatus for transmission control provided in other implementations of the disclosure.

In exemplary implementations, as illustrated in FIG. 10, the apparatus 900 further includes a transmission resuming module 930. The transmission resuming module 930 is configured to: resume the first timer after the feeder link switch is completed.

In exemplary implementations, the indication information includes first time information and second time information, the first time information indicates a start moment t1 of the feeder link switch, and the second time information indicates a completion moment t2 of the feeder link switch. The transmission suspending module is configured to: pause the first timer at the start moment t1. The transmission resuming module is configured to: resume the first timer at the completion moment t2.

In exemplary implementations, the indication information includes second time information, and the second time information indicates a completion moment t2 of the feeder link switch. The transmission suspending module is configured to: pause the first timer upon receiving the indication information. The transmission resuming module is configured to: resume the first timer at the completion moment t2.

In exemplary implementations, the indication information includes first time information and duration information, the first time information indicates a start moment t1 of the feeder link switch, and the duration information indicates a duration $\Delta t$ of the feeder link switch. The transmission suspending module is configured to: pause the first timer at the start moment t1. The transmission resuming module is configured to: resume the first timer at a completion moment $t1+\Delta t$ of the feeder link switch.

In exemplary implementations, the first timer includes at least one of: a CG timer (configuredGrantTimer) corresponding to each UL HARQ process reserved for CG, a SR prohibit timer (sr-ProhibitTimer) corresponding to each SR configuration, a BSR retransmission timer (retxBSR-Timer), a BSR periodic timer (periodicBSR-Timer), a DRX inactivity timer (drx-InactivityTimer), a DRX DL retransmission timer (drx-RetransmissionTimerDL) corresponding to each DL HARQ process, a DRX UL retransmission timer (drx- RetransmissionTimerUL) corresponding to each UL HARQ process, a DRX short cycle timer (drx-ShortCycleTimer), a SCell deactivation timer (sCellDeactivationTimer) corresponding to each SCell, a BWP inactivity timer (bwp-InactivityTimer), a data inactivity timer (dataInactivityTimer), a beam failure detection timer (beamFailureDetectionTimer) for beam failure detection, a beam failure recovery timer (beamFailureRecoveryTimer) for beam failure recovery, and a time alignment timer (timeAlignmentTimer) corresponding to a TAG.

In exemplary implementations, the information receiving module 910 is configured to: receive a system message from the network device, where the system message includes the indication information, receive a RRC signaling from the network device, where the RRC signaling includes the indication information, or receive a MAC CE signaling from the network device, where the MAC CE signaling includes the indication information.

In conclusion, in the technical solutions provided in implementations of the disclosure, for two NTN gateways connected to the same cell, during the feeder link switch (hard switch) performed by the satellite between the two NTN gateways, the UL transmission and/or the DL transmission between the terminal device and the network device are suspended, so as to prevent the terminal device and the network device from performing unnecessary operations, thereby reducing the system overhead.

Figure 11:
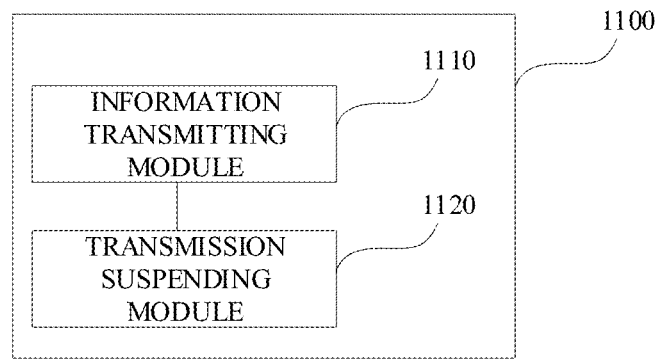
FIG. 11 is a block diagram of an apparatus for transmission control provided in other implementations of the disclosure.

Referring to FIG. 11, FIG. 11 is a block diagram of an apparatus for transmission control provided in other implementations of the disclosure. The apparatus has a function configured to implement method examples at network device side, and the function may be implemented by hardware, or by executing corresponding software by hardware. The apparatus may be a network device, or may be provided in the network device. As illustrated in FIG. 11, the apparatus 1100 may include an information transmitting module 1110 and a transmission suspending module 1120.

The information transmitting module 1110 is configured to: transmit indication information to a terminal device, where the indication information indicates that a satellite in communication with the terminal device performs feeder link switch between a first NTN gateway and a second NTN gateway, and the first NTN gateway and the second NTN gateway are connected to a same cell corresponding to the network device. The transmission suspending module 1120 is configured to: suspend UL transmission and/or DL transmission with the terminal device during the feeder link switch.

In exemplary implementations, the indication information includes at least one of: first time information indicating a start moment of the feeder link switch, second time information indicating a completion moment of the feeder link switch, and duration information indicating a duration of the feeder link switch.

In exemplary implementations, the information transmitting module 1110 is configured to: transmit a system message to the terminal device, where the system message includes the indication information, transmit a RRC signaling to the terminal device, where the RRC signaling includes the indication information, or transmit a MAC CE signaling to the terminal device, where the MAC CE signaling includes the indication information.

Figure 12:
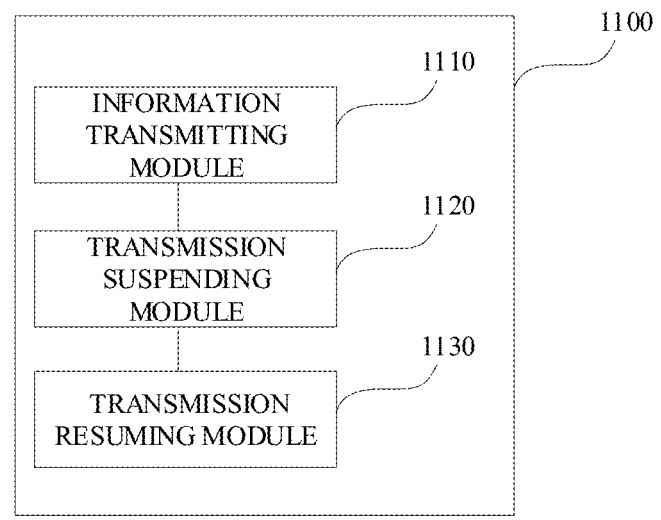
FIG. 12 is a block diagram of an apparatus for transmission control provided in other implementations of the disclosure.

In exemplary implementations, as illustrated in FIG. 12, the apparatus 1100 further includes a transmission resuming module 1130. The transmission resuming module 1130 is configured to: resume the UL transmission and/or the DL transmission with the terminal device after the feeder link switch is completed.

In conclusion, in the technical solutions provided in implementations of the disclosure, for two NTN gateways connected to the same cell, during the feeder link switch (hard switch) performed by the satellite between the two NTN gateways, the UL transmission and/or the DL transmission between the terminal device and the network device are suspended, so as to prevent the terminal device and the network device from performing unnecessary operations, thereby reducing the system overhead.

It should be noted that, when the apparatus provided in above implementations realizes its functions, the division of the above functional modules is merely used as an example for illustration. In practical applications, the above functions may be allocated to different functional modules to be completed according to actual needs. That is, the content structure of the device is divided into different functional modules to complete all or part of the functions described above.

Regarding the apparatus in foregoing implementations, the specific manner in which each module performs the operation has been described in detail in implementations related to the method, which will not be described in detail herein.

Figure 13:
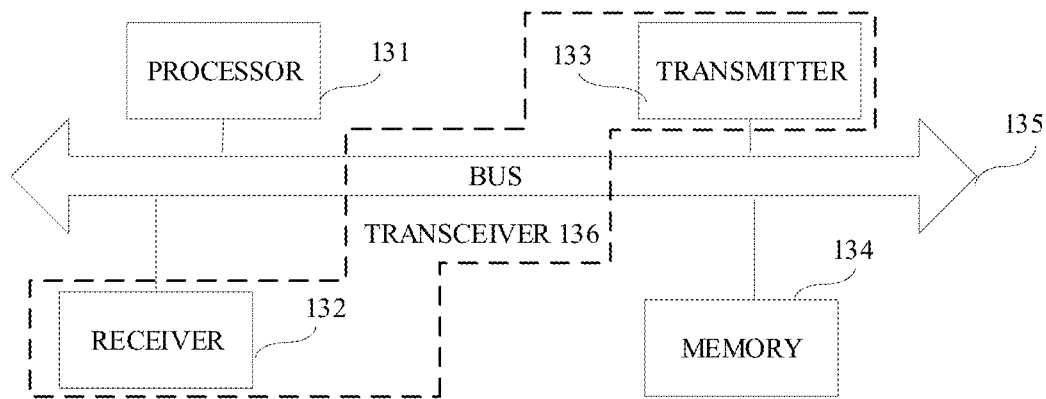
FIG. 13 is a schematic structural diagram of a terminal device provided in implementations of the disclosure.

Referring to FIG. 13, FIG. 13 is a schematic structural diagram of a terminal device 130 provided in implementations of the disclosure. The terminal device 130 may include a processor 131, a receiver 132, a transmitter 133, a memory 134, and a bus 135.

The processor 131 includes one or more processing cores. The processor 131 performs various functional applications and information processing by running software programs and modules.

The receiver 132 and the transmitter 133 may be implemented as a transceiver 136. The transceiver 136 may be a communication chip.

The memory 134 is connected to the processor 131 via the bus 135.

The memory 134 may be configured to store computer programs, and the processor 131 is configured to execute the computer programs to implement various steps performed by the terminal device in foregoing method implementations.

In addition, the memory 134 may be implemented by any type of volatile or non-volatile storage devices or combinations thereof. The volatile or non-volatile storage devices include, but are not limited to: a random-access memory (RAM), a read-only memory (ROM), an erasable programmable ROM (EPROM), an electrically erasable programmable ROM (EEPROM), a flash memory or other solid-state storage technologies, a compact disc ROM (CD-ROM), a digital video disc (DVD), or other optical storages, tape cartridges, magnetic tapes, magnetic disk storages, or other magnetic storage devices.

The transceiver 136 is configured to: receive indication information from a network device, where the indication information indicates that a satellite in communication with a terminal device performs feeder link switch between a first NTN gateway and a second NTN gateway, and the first NTN gateway and the second NTN gateway are connected to a same cell corresponding to the network device. The processor 131 is configured to: suspend UL transmission and/or DL transmission with the network device according to the indication information during the feeder link switch.

In exemplary implementations, the processor 131 is configured to: pause a first timer related to a MAC entity of the terminal device, where the first timer is used to control the MAC entity to perform UL transmission and/or DL transmission.

In exemplary implementations, the processor 131 is further configured to: resume the first timer after the feeder link switch is completed.

In exemplary implementations, the indication information includes first time information and second time information, the first time information indicates a start moment t1 of the feeder link switch, and the second time information indicates a completion moment t2 of the feeder link switch. The processor 131 is configured to: pause the first timer at the start moment t1. The processor 131 is further configured to: resume the first timer at the completion moment t2.

In exemplary implementations, the indication information includes second time information, and the second time information indicates a completion moment t2 of the feeder link switch. The processor 131 is configured to: pause the first timer upon receiving the indication information. The processor 131 is further configured to: resume the first timer at the completion moment t2.

In exemplary implementations, the indication information includes first time information and duration information, the first time information indicates a start moment t1 of the feeder link switch, and the duration information indicates a duration $\Delta t$ of the feeder link switch. The processor 131 is configured to: pause the first timer at the start moment t1. The processor 131 is further configured to: resume the first timer at a completion moment t1+$\Delta t$ of the feeder link switch.

In exemplary implementations, the first timer includes at least one of: a CG timer (configuredGrantTimer) corresponding to each UL HARQ process reserved for CG, a SR prohibit timer (sr-ProhibitTimer) corresponding to each SR configuration, a BSR retransmission timer (retxBSR-Timer), a BSR periodic timer (periodicBSR-Timer), a DRX inactivity timer (drx-InactivityTimer), a DRX DL retransmission timer (drx-RetransmissionTimerDL) corresponding to each DL HARQ process, a DRX UL retransmission timer (drx-RetransmissionTimerUL) corresponding to each UL HARQ process, a DRX short cycle timer (drx-ShortCycleTimer), a SCell deactivation timer (sCellDeactivationTimer) corresponding to each SCell, a BWP inactivity timer (bwp-InactivityTimer), a data inactivity timer (dataInactivityTimer), a beam failure detection timer (beamFailureDetectionTimer) for beam failure detection, a beam failure recovery timer (beamFailureRecoveryTimer) for beam failure recovery, and a time alignment timer (timeAlignmentTimer) corresponding to a TAG.

In exemplary implementations, the transceiver 136 is configured to: receive a system message from the network device, where the system message includes the indication information, receive a RRC signaling from the network device, where the RRC signaling includes the indication information, or receive a MAC CE signaling from the network device, where the MAC CE signaling includes the indication information.

Figure 14:
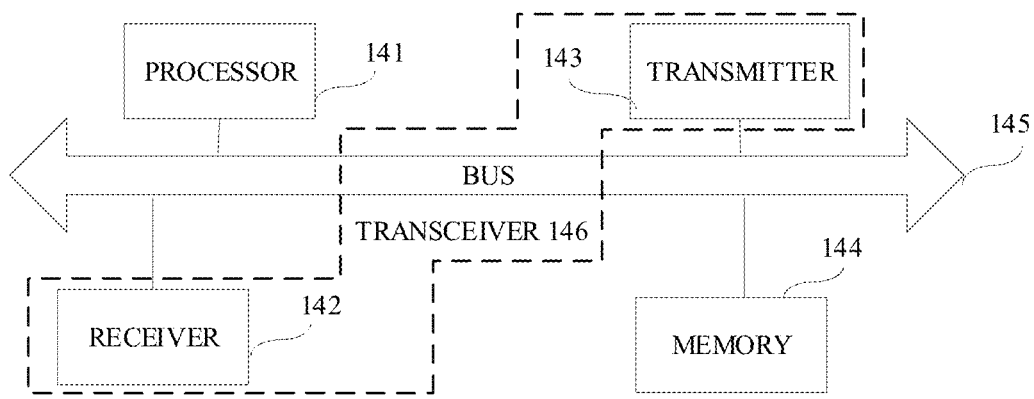
FIG. 14 is a schematic structural diagram of a network device provided in implementations of the disclosure.

Referring to FIG. 14, FIG. 14 is a schematic structural diagram of a network device 140 provided in implementations of the disclosure. The network device 140 may include a processor 141, a receiver 142, a transmitter 143, a memory 144, and a bus 145.

The processor 141 includes one or more processing cores. The processor 141 performs various functional applications and information processing by running software programs and modules.

The receiver 142 and the transmitter 143 may be implemented as a transceiver 146. The transceiver 146 may be a communication chip.

The memory 144 is connected to the processor 141 via the bus 145.

The memory 144 may be configured to store computer programs, and the processor 141 is configured to execute the computer programs to implement various steps performed by the network device in foregoing method implementations.

In addition, the memory 144 may be implemented by any type of volatile or non-volatile storage devices or combinations thereof. The volatile or non-volatile storage devices include, but are not limited to: a RAM, a ROM, an EPROM, an EEPROM, a flash memory or other solid-state storage technologies, a CD-ROM, a DVD, or other optical storages, tape cartridges, magnetic tapes, magnetic disk storages, or other magnetic storage devices.

The transceiver 146 is configured to: transmit indication information to a terminal device, where the indication information indicates that a satellite in communication with the terminal device performs feeder link switch between a first NTN gateway and a second NTN gateway, and the first NTN gateway and the second NTN gateway are connected to a same cell corresponding to the network device. The processor 141 is configured to: suspend UL transmission and/or DL transmission with the terminal device during the feeder link switch.

In exemplary implementations, the indication information includes at least one of: first time information indicating a start moment of the feeder link switch, second time information indicating a completion moment of the feeder link switch, and duration information indicating a duration of the feeder link switch.

In exemplary implementations, the transceiver 146 is configured to: transmit a system message to the terminal device, where the system message includes the indication information, transmit a RRC signaling to the terminal device, where the RRC signaling includes the indication information, or transmit a MAC CE signaling to the terminal device, where the MAC CE signaling includes the indication information.

In exemplary implementations, the processor 141 is further configured to: resume the UL transmission and/or the DL transmission with the terminal device after the feeder link switch is completed.

Implementations of the disclosure provide a computer-readable storage medium. The storage medium stores computer programs. The computer programs are operable with a processor of a terminal device to perform the method for transmission control at terminal device side.

Implementations of the disclosure provide a computer-readable storage medium. The storage medium stores computer programs. The computer programs are operable with a processor of a network device to perform the method for transmission control at network device side.

Implementations of the disclosure provide a chip. The chip includes a programmable logic circuit and/or program instructions. When running on a terminal device, the chip is configured to perform the method for transmission control at terminal device side.

Implementations of the disclosure provide a chip. The chip includes a programmable logic circuit and/or program instructions. When running on a network device, the chip is configured to perform the method for transmission control at network device side.

The disclosure further provides a computer program product. When running on a processor of a terminal device, the computer program product causes the terminal device to perform the method for transmission control at terminal device side.

The disclosure further provides a computer program product. When running on a processor of a network device, the computer program product causes the network device to perform the method for transmission control at network device side.

Those skilled in the art should appreciate that, in one or more examples described above, functions described in the implementations of the disclosure may be implemented by hardware, software, firmware, or any combination thereof. When implemented by software, the functions may be stored in a computer-readable medium or transmitted as one or more instructions or codes on the computer-readable medium. The computer-readable medium includes a computer storage medium and a communication medium, where the communication medium includes any medium facilitating transfer of a computer program from one place to another place. The storage medium may be any available medium that can be accessed by a general-purpose computer or special-purpose computer.

The above are only exemplary implementations of the disclosure, which are not intended to limit the disclosure. Any modification, equivalent substitution, improvement, etc., made within the spirit and principles of the disclosure shall fall within the protection scope of the disclosure.

What is claimed is:

1. A method for transmission control, being applicable to a terminal device and comprising:
receiving indication information from a network device, the indication information indicating that a satellite in communication with the terminal device performs feeder link switch between a first non-terrestrial network (NTN) gateway and a second NTN gateway, and the first NTN gateway and the second NTN gateway being connected to a same cell corresponding to the network device; and
suspending uplink (UL) transmission and/or downlink (DL) transmission with the network device according to the indication information during the feeder link switch.

2. The method of claim 1, wherein suspending the UL transmission and/or the DL transmission with the network device comprises:
pausing a first timer related to a media access control (MAC) entity of the terminal device, wherein the first timer is used to control the MAC entity to perform UL transmission and/or DL transmission.

3. The method of claim 2, wherein after pausing the first timer related to the MAC entity of the terminal device, the method further comprises:
resuming the first timer after the feeder link switch is completed.

4. The method of claim 3, wherein the indication information comprises first time information and second time information, the first time information indicates a start moment t1 of the feeder link switch, and the second time information indicates a completion moment t2 of the feeder link switch;
pausing the first timer related to the MAC entity of the terminal device comprises:
pausing the first timer at the start moment t1; and
resuming the first timer after the feeder link switch is completed comprises:
resuming the first timer at the completion moment t2.

5. The method of claim 3, wherein the indication information comprises second time information, and the second time information indicates a completion moment t2 of the feeder link switch;
pausing the first timer related to the MAC entity of the terminal device comprises:
pausing the first timer upon receiving the indication information; and
resuming the first timer after the feeder link switch is completed comprises:
resuming the first timer at the completion moment t2.

6. The method of claim 3, wherein the indication information comprises first time information and duration information, the first time information indicates a start moment t1 of the feeder link switch, and the duration information indicates a duration Δt of the feeder link switch;
pausing the first timer related to the MAC entity of the terminal device comprises:
pausing the first timer at the start moment t1; and
resuming the first timer after the feeder link switch is completed comprises:
resuming the first timer at a completion moment t1+Δt of the feeder link switch.

7. The method of claim 2, wherein the first timer comprises at least one of:
a configured grant (CG) timer (configuredGrantTimer) corresponding to each UL hybrid automatic repeat request (HARQ) process reserved for CG;
a scheduling request (SR) prohibit timer (sr-ProhibitTimer) corresponding to each SR configuration;
a buffer status report (BSR) retransmission timer (retxBSR-Timer);
a BSR periodic timer (periodicBSR-Timer);
a discontinuous reception (DRX) inactivity timer (drx-InactivityTimer);
a DRX DL retransmission timer (drx-RetransmissionTimerDL) corresponding to each DL HARQ process;
a DRX UL retransmission timer (drx-RetransmissionTimerUL) corresponding to each UL HARQ process;
a DRX short cycle timer (drx-ShortCycleTimer);
a secondary cell (SCell) deactivation timer (sCellDeactivation Timer) corresponding to each SCell;
a bandwidth part (BWP) inactivity timer (bwp-InactivityTimer);
a data inactivity timer (dataInactivityTimer);
a beam failure detection timer (beamFailureDetectionTimer) for beam failure detection;
a beam failure recovery timer (beamFailureRecoveryTimer) for beam failure recovery; and
a time alignment timer (timeAlignmentTimer) corresponding to a timing advance group (TAG).

8. The method of claim 1, wherein receiving the indication information from the network device comprises:
receiving a system message from the network device, wherein the system message comprises the indication information;
receiving a radio resource control (RRC) signaling from the network device, wherein the RRC signaling comprises the indication information; or
receiving a MAC control element (CE) signaling from the network device, wherein the MAC CE signaling comprises the indication information.

9. A method for transmission control, being applicable to a network device and comprising:
   transmitting indication information to a terminal device, the indication information indicating that a satellite in communication with the terminal device performs feeder link switch between a first non-terrestrial network (NTN) gateway and a second NTN gateway, and the first NTN gateway and the second NTN gateway being connected to a same cell corresponding to the network device; and
   suspending uplink (UL) transmission and/or downlink (DL) transmission with the terminal device during the feeder link switch.

10. The method of claim 9, wherein the indication information comprises at least one of:
   first time information indicating a start moment of the feeder link switch;
   second time information indicating a completion moment of the feeder link switch; and
   duration information indicating a duration of the feeder link switch.

11. The method of claim 9, wherein transmitting the indication information to the terminal device comprises:
   transmitting a system message to the terminal device, wherein the system message comprises the indication information;
   transmitting a radio resource control (RRC) signaling to the terminal device, wherein the RRC signaling comprises the indication information; or
   transmitting a media access control (MAC) control element (CE) signaling to the terminal device, wherein the MAC CE signaling comprises the indication information.

12. The method of claim 9, further comprising:
   resuming the UL transmission and/or the DL transmission with the terminal device after the feeder link switch is completed.

13. A terminal device, comprising:
   a transceiver;
   a memory configured to store computer programs; and
   a processor configured to invoke and execute the computer programs stored in the memory to cause the transceiver to:
      receive indication information from a network device, the indication information indicating that a satellite in communication with the terminal device performs feeder link switch between a first non-terrestrial network (NTN) gateway and a second NTN gateway, and the first NTN gateway and the second NTN gateway being connected to a same cell corresponding to the network device; and
      suspend uplink (UL) transmission and/or downlink (DL) transmission with the network device according to the indication information during the feeder link switch.

14. The terminal device of claim 13, wherein the processor configured to suspend the UL transmission and/or the DL transmission with the network device is configured to:
   pause a first timer related to a media access control (MAC) entity of the terminal device, wherein the first timer is used to control the MAC entity to perform UL transmission and/or DL transmission.

15. The terminal device of claim 14, wherein after pausing the first timer related to the MAC entity of the terminal device, the processor is further configured to:
   resume the first timer after the feeder link switch is completed.

16. The terminal device of claim 15, wherein the indication information comprises first time information and second time information, the first time information indicates a start moment t1 of the feeder link switch, and the second time information indicates a completion moment t2 of the feeder link switch;
   the processor configured to pause the first timer related to the MAC entity of the terminal device is configured to:
      pause the first timer at the start moment t1; and
   the processor configured to resume the first timer after the feeder link switch is completed is configured to:
      resume the first timer at the completion moment t2.

17. The terminal device of claim 15, wherein the indication information comprises second time information, and the second time information indicates a completion moment t2 of the feeder link switch;
   the processor configured to pause the first timer related to the MAC entity of the terminal device is configured to:
      pause the first timer upon receiving the indication information; and
   the processor configured to resume the first timer after the feeder link switch is completed is configured to:
      resume the first timer at the completion moment t2.

18. The terminal device of claim 15, wherein the indication information comprises first time information and duration information, the first time information indicates a start moment t1 of the feeder link switch, and the duration information indicates a duration $\Delta t$ of the feeder link switch;
   the processor configured to pause the first timer related to the MAC entity of the terminal device the transmission suspending module is configured to:
      pause the first timer at the start moment t1; and
   the processor configured to resume the first timer after the feeder link switch is completed the transmission resuming module is configured to:
      resume the first timer at a completion moment $t1+\Delta t$ of the feeder link switch.

19. The terminal device of claim 14, wherein the first timer comprises at least one of:
   a configured grant (CG) timer (configuredGrantTimer) corresponding to each UL hybrid automatic repeat request (HARQ) process reserved for CG;
   a scheduling request (SR) prohibit timer (sr-ProhibitTimer) corresponding to each SR configuration;
   a buffer status report (BSR) retransmission timer (retxBSR-Timer);
   a BSR periodic timer (periodicBSR-Timer);
   a discontinuous reception (DRX) inactivity timer (drx-InactivityTimer);
   a DRX DL retransmission timer (drx-RetransmissionTimerDL) corresponding to each DL HARQ process;
   a DRX UL retransmission timer (drx-RetransmissionTimerUL) corresponding to each UL HARQ process;
   a DRX short cycle timer (drx-ShortCycleTimer);
   a secondary cell (SCell) deactivation timer (sCellDeactivation Timer) corresponding to each SCell;
   a bandwidth part (BWP) inactivity timer (bwp-InactivityTimer);
   a data inactivity timer (dataInactivityTimer);
   a beam failure detection timer (beamFailureDetectionTimer) for beam failure detection;
   a beam failure recovery timer (beamFailureRecoveryTimer) for beam failure recovery; and
   a time alignment timer (timeAlignmentTimer) corresponding to a timing advance group (TAG).

20. The terminal device of claim 13, wherein the processor configured to cause the transceiver to receive the indication information from the network device is configured to cause the transceiver to:
    receive a system message from the network device, wherein the system message comprises the indication information;
    receive a radio resource control (RRC) signaling from the network device, wherein the RRC signaling comprises the indication information; or
    receive a MAC control element (CE) signaling from the network device, wherein the MAC CE signaling comprises the indication information.

\* \* \* \* \*